United States Patent
Mitra et al.

(10) Patent No.: US 11,546,737 B2
(45) Date of Patent: Jan. 3, 2023

(54) ROLE-BASED HMI CONTEXT DYNAMIC UPDATE

(71) Applicant: Ford Global Technologies, LLC, Dearborn, MI (US)

(72) Inventors: Pramita Mitra, West Bloomfield, MI (US); Pietro Buttolo, Dearborn Heights, MI (US); Basavaraj Tonshal, Northville, MI (US); Qianyi Wang, Allen Park, MI (US); Gary Steven Strumolo, Canton, MI (US); Kelly Lee Zechel, Plymouth, MI (US); Brian Nash, Northville, MI (US); Theodore Wingrove, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 412 days.

(21) Appl. No.: 16/634,597

(22) PCT Filed: Aug. 1, 2017

(86) PCT No.: PCT/US2017/044795
§ 371 (c)(1),
(2) Date: Jan. 28, 2020

(87) PCT Pub. No.: WO2019/027440
PCT Pub. Date: Feb. 7, 2019

(65) Prior Publication Data
US 2020/0162859 A1 May 21, 2020

(51) Int. Cl.
*H04L 51/212* (2022.01)
*B60R 22/48* (2006.01)
(Continued)

(52) U.S. Cl.
CPC .............. *H04W 4/12* (2013.01); *B60R 22/48* (2013.01); *H04L 51/212* (2022.05);
(Continued)

(58) Field of Classification Search
CPC ............ B60R 22/48; B60R 2022/4816; B60R 2022/4808
See application file for complete search history.

(56) References Cited

U.S. PATENT DOCUMENTS 8,527,146 B1  9/2013  Jackson et al.
8,989,961 B2  3/2015  Chien
(Continued)

FOREIGN PATENT DOCUMENTS

WO   2016/145054 A1   9/2016
WO   WO-2016145054 A1 *  9/2016   ......... A44B 11/2523

OTHER PUBLICATIONS

International Search Report of the International Searching Authority for PCT/US2017/044795 dated Oct. 6, 2017.

*Primary Examiner* — Jinsong Hu
*Assistant Examiner* — Farideh Madani
(74) *Attorney, Agent, or Firm* — Brandon Hicks; Bejin Bieneman PLC

(57) ABSTRACT

A vehicle occupant messaging system includes a communication tag located in a buckle of a vehicle seatbelt assembly and configured to wirelessly transmit signals, to a mobile device, representing a location of a passenger using the mobile device in a host vehicle. The system further includes a communication transceiver programmed to transmit messages to the mobile device and a system processor programmed to generate the messages to the mobile device, the messages identifying the location of the passenger.

9 Claims, 5 Drawing Sheets

(51) Int. Cl.
*H04W 4/40* (2018.01)
*H04W 4/12* (2009.01)
*H04W 4/029* (2018.01)

(52) U.S. Cl.
CPC ............ *H04W 4/029* (2018.02); *H04W 4/40* (2018.02); *B60R 2022/4816* (2013.01)

(56) References Cited

U.S. PATENT DOCUMENTS

| | | |
|---|---|---|
| 9,224,289 B2 | 12/2015 | Demeniuk et al. |
| 9,499,173 B2 | 11/2016 | Waeller |
| 9,596,355 B2 | 3/2017 | Choi et al. |
| 2002/0188392 A1* | 12/2002 | Breed ................ B60C 11/24 701/45 |
| 2008/0068220 A1* | 3/2008 | Giesa ................ B60R 22/48 340/945 |
| 2008/0256478 A1 | 10/2008 | Bromley et al. |
| 2009/0284394 A1* | 11/2009 | Boss ................ G08G 1/0962 340/907 |
| 2013/0030645 A1 | 1/2013 | Divine et al. |
| 2014/0125355 A1 | 5/2014 | Grant |
| 2014/0277935 A1* | 9/2014 | Daman ............... G08G 1/127 701/36 |
| 2015/0253753 A1 | 9/2015 | Bennett et al. |
| 2015/0362997 A1 | 12/2015 | Hatton |
| 2017/0120813 A1 | 5/2017 | Wilson et al. |
| 2018/0374126 A1* | 12/2018 | Patil ................ H04W 4/40 |

\* cited by examiner

ROLE-BASED HMI CONTEXT DYNAMIC UPDATE

BACKGROUND

Mobile devices are ubiquitous. Vehicle passengers often bring their cell phone, tablet computer, laptop computer, smartwatch, etc. into a vehicle. Many times, one or more passenger connect the mobile device to the vehicle computer.

DETAILED DESCRIPTION

Figure 1:
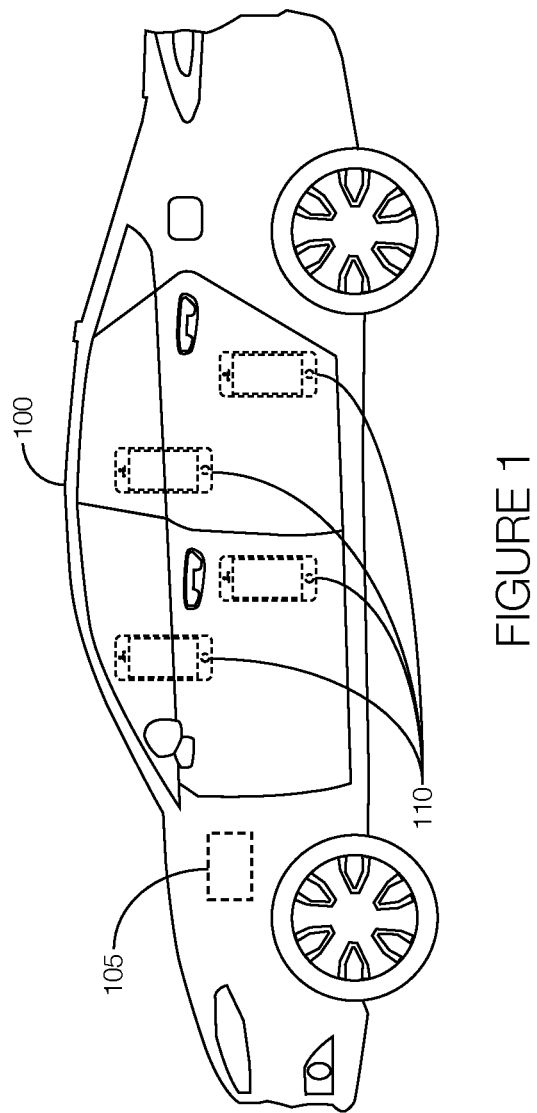
FIG. 1 illustrates an example vehicle with an occupant messaging system that helps an occupant's mobile device determine which messages to present to the occupant.

Some mobile devices can present a contextual user interface that allows an occupant to control features of a host vehicle from the mobile device. Such features may include climate controls, infotainment system controls, door locks, etc. Moreover, the mobile device may present messages, such as advanced driver-assistance system (ADAS) alerts, concerning the operation of the host vehicle. Not all occupants may wish to receive all messages. Further, the vehicle owner may not wish for all occupants to have access to all controls via the occupant's mobile device.

One solution involves a vehicle occupant messaging system that includes a communication tag located in a buckle of a vehicle seatbelt assembly and configured to wirelessly transmit signals, to a mobile device, representing a location of a passenger using the mobile device in a host vehicle. The system further includes a communication transceiver programmed to transmit messages to the mobile device and a system processor programmed to generate the messages to the mobile device, the messages identifying the location of the passenger.

In one possible approach, the buckle may be configured to block the signals transmitted by the communication tag when the seatbelt assembly is unfastened. For example, the buckle may include a metal shield that at least partially encapsulates the communication tag when the seatbelt assembly is unfastened. The vehicle seatbelt assembly may include a latch that moves the metal shield away from the communication tag when the seatbelt assembly is fastened. The system processor may be programmed to receive the location of the passenger from the mobile device. In some possible implementations, the system processor may be programmed to select a contextual user interface based on the location of the passenger. The system processor may be programmed to command the mobile device to present the contextual user interface. The communication transceiver may be programmed to receive commands from the mobile device. In that instance, the system processor may be programmed to process the commands received from the mobile device. Messages generated by the system processor may include at least one of driver-assistance system alerts, messages associated with a vehicle infotainment system, and messages associated with a climate control system. The mobile device may be programmed to filter messages according to the location represented by the signal transmitted from the communication tag and only display filtered messages.

An example method may include determining a location of a mobile device in a host vehicle based on signals received from a communication tag located in a buckle of a seatbelt assembly, displaying, via the mobile device, a contextual user interface associated with the location of the mobile device in the host vehicle, receiving messages transmitted from an occupant messaging system, filtering the messages according to the location of the mobile device in the host vehicle, and displaying the filtered messages on the mobile device.

The method may further include transmitting the location of the mobile device in the host vehicle to the occupant messaging system. The method may also include receiving the contextual user interface from the occupant messaging system. In some instances, receiving the contextual user interface from the occupant messaging system may occur after transmitting the location of the mobile device in the host vehicle to the occupant messaging system. In the method, displaying the contextual user interface may include presenting prompts for commands for a passenger to control at least one vehicle subsystem via the mobile device. The method may also include receiving a user input representing a command to control at least one vehicle subsystem as a result of presenting prompts for the passenger to control at least one vehicle subsystem. In this possible implementation, the method may further include transmitting the command to the occupant messaging system. In some instances, the prompts presented on the contextual user interface are based at least in part on the location of the mobile device in the host vehicle.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

As illustrated in FIG. 1, the host vehicle 100 includes an occupant messaging system 105 in communication with any number of mobile devices 110 carried by the passengers of the host vehicle 100. Although illustrated as a sedan, the host vehicle 100 is any passenger or commercial automobile such as a car, a truck, a sport utility vehicle, a crossover vehicle, a van, a minivan, a taxi, a bus, etc. The host vehicle 100 may be an autonomous vehicle that can operate in an autonomous (e.g., driverless) mode, a partially autonomous mode, and/or a non-autonomous mode.

The occupant messaging system 105, which may be integrated into the host vehicle 100, is programmed to identify passengers in different seats, identify the mobile device 110 carried by each passenger, and communicate with each mobile device 110. The occupant messaging system 105 may send messages such as advanced driver-assistance system (ADAS) alerts, messages associated with the infotainment system, messages associated with cabin information, etc. Moreover, the occupant messaging system 105 may receive communications from the mobile devices 110. Examples of such communications may include infotainment system controls and cabin information and controls. The communications may be different for different passengers. That is, the front passengers may have access to different infotainment and cabin controls than the rear passengers.

Each mobile device 110 determines where the passenger carrying the mobile device 110 is located in the host vehicle 100. The mobile device 110 receives messages from the occupant messaging system 105 and filters the messages according to where the passenger carrying the mobile device 110 is located. Thus, while the mobile device 110 receives all messages, only those relevant to the passenger are presented on the mobile device 110. The mobile device 110 further displays a context-specific user interface based on passenger location. Thus, the mobile device 110 may present infotainment and cabin controls for the passenger based on where the passenger is seated. For example, a rear passenger may only have access to cabin controls for the rear vehicle seats via the mobile device 110 while a front passenger may have access to cabin controls for only the front vehicle seats. The controls may be even more granular. A mobile device 110 of a rear seat passenger may only allow the passenger to control the blower, vents, and temperature associated with his or her seat via his or her mobile device 110.

Figure 2:
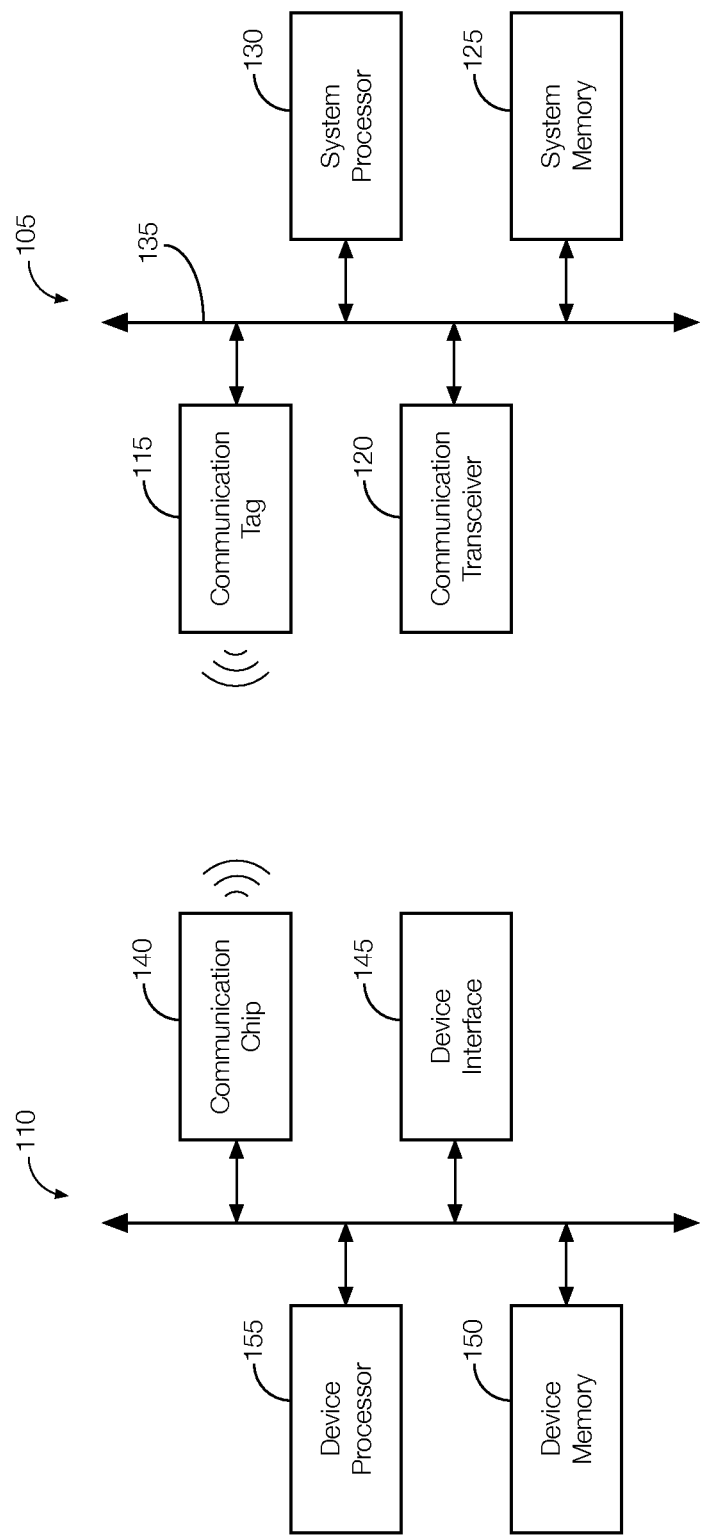
FIG. 2 is a block diagram showing example components of the occupant messaging system and of the mobile device.

Referring now to FIG. 2, components of the occupant messaging system 105 may communicate with components of the mobile device 110. As shown in FIG. 2, the occupant messaging system 105 includes a communication tag 115, a communication transceiver 120, a system memory 125, and a system processor 130. The communication transceiver 120, the system memory 125, and the system processor 130 may be in communication over a vehicle communication bus 135, which may include a Controller Area Network (CAN) bus, Ethernet, or the like. The mobile device 110 includes at least one communication chip 140, a device interface 145, a device memory 150, and a device processor 155.

Figure 3A:
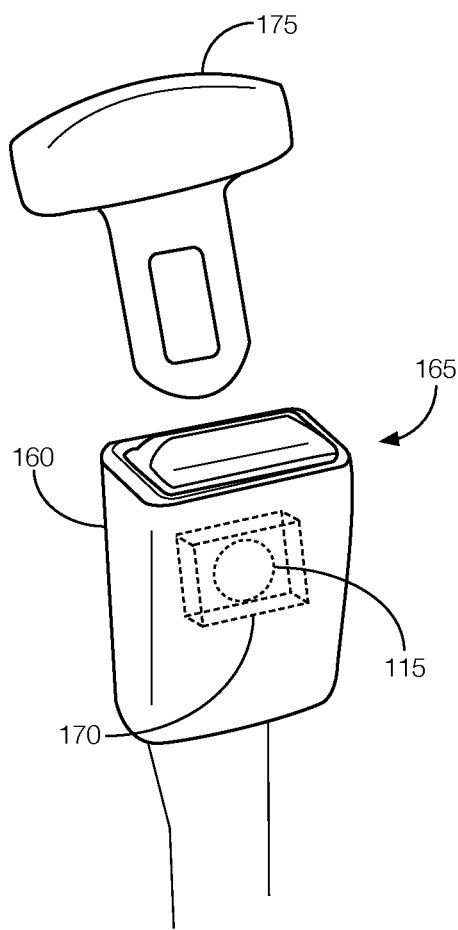
FIGS. 3A and 3B illustrate an example seatbelt buckle with a communication shield.
Figure 3B:
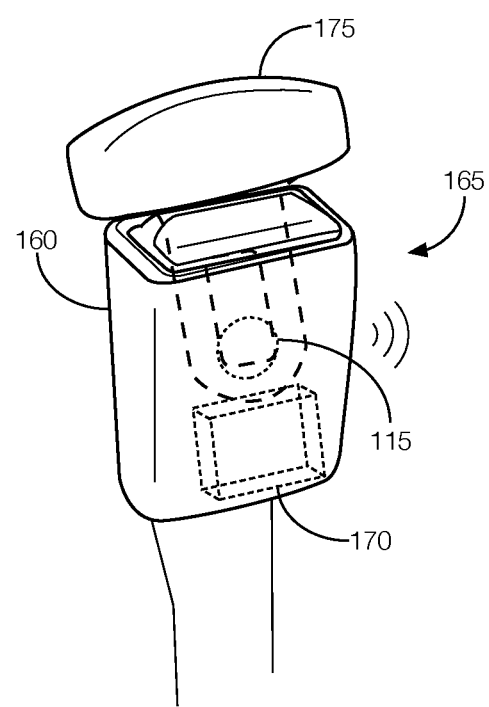

The communication tag 115 is implemented via circuits, chips, or other electronic components that can wirelessly communicate with the mobile device 110 over a short communication range. For instance, the communication tag 115 may implement near-field communication (NFC) technology. As shown in FIGS. 3A and 3B, the communication tag 115 may be located in the seatbelt buckle 160. When the seatbelt is buckle 160d, the communication tag 115 may wirelessly communicate with a corresponding communication chip 140 in the mobile device 110. The communication tag 115 may transmit the location of the passenger to the communication chip 140 in the mobile device 110. The communication tag 115 may have a short communication range, on the order of 20 cm. Therefore, each passenger's mobile device 110 may only be able to receive messages from the communication tag 115 incorporated into the seatbelt used by that passenger. Therefore, the mobile device 110 can determine where the passenger is located based on the message received from the communication tag 115.

The communication transceiver 120 is implemented via an antenna, circuits, chips, or other electronic components that facilitate wireless communication between the occupant messaging system 105 and the mobile device 110. The communication transceiver 120 may be programmed to communicate in accordance with any number of wired or wireless communication protocols. For instance, the communication transceiver 120 may be programmed to communicate in accordance with a satellite-communication protocol, a cellular-based communication protocol (LTE, 3G, etc.), Bluetooth®, Bluetooth® Low Energy, Ethernet, the Controller Area Network (CAN) protocol, WiFi, the Local Interconnect Network (LIN) protocol, etc. In some instances, the communication transceiver 120 is incorporated into a vehicle telematics unit.

The system memory 125 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The system memory 125 may store instructions executable by the system processor 130 and data such as messages or other messages generated or received by the occupant messaging system 105. The instructions and data stored in the system memory 125 may be accessible to the system processor 130 and possibly other components of the occupant messaging system 105, the host vehicle 100, or both.

The system processor 130, which is part of a vehicle computer, is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. The system processor 130 may be programmed to process messages received from the mobile device 110. The messages from the mobile device 110 may include instructions for controlling various vehicle systems such as, e.g., the infotainment system, the climate control system, door locks, windows, etc. The system processor 130 may also be programmed to determine which seat is associated with each mobile device 110 from the messages received from each mobile device 110. The system processor 130 may be programmed to generate messages to the occupants. The messages may include ADAS alerts, infotainment system messages, or the like. Other messages may include information about the infotainment system, the climate control system, or other systems of the host vehicle 100. The system processor 130 may command the communication transceiver 120 to transmit the messages and messages to the mobile device 110. As discussed above, the mobile device 110 may filter the messages and messages so that the occupant using the mobile device 110 will only see the messages and messages appropriate for where the occupant is seated (e.g., rear seat passengers will only see messages and messages intended for the rear seat passengers, front passengers will only see messages and messages intended for front seat passengers, only the driver will receive ADAS alerts, etc.).

The communication chip 140 is implemented via an antenna, circuits, chips, or other electronic components that facilitate wireless communication between the mobile device 110 and the occupant messaging system 105. The communication chip 140 may be programmed to communicate in accordance with any number of wireless communication protocols. For instance, the communication chip 140 may be programmed to communicate in accordance with a satellite-communication protocol, a cellular-based communication protocol (LTE, 3G, etc.), a near field communication (NFC) protocol, Bluetooth®, Bluetooth® Low Energy, etc. In some instances, the communication chip 140 is programmed to receive communications transmitted from the communication tag 115 of the occupant messaging system 105. The communication chip 140 may also be programmed to communicate with the communication transceiver 120 of the occupant messaging system 105.

The device interface 145 is implemented via a display screen, input device, circuits, chips, or other electronic components that receive user inputs from the user of the mobile device 110. The device interface 145 may include a touchscreen, a keyboard, mouse, etc. The display screen may present a contextual user interface to the user and may receive user inputs. Messages and messages transmitted from the occupant messaging system 105 may be presented via the display screen. User inputs received by the device interface 145 may include control selections for the infotainment system, the climate control system, doors, windows, or other components or systems of the host vehicle 100.

The device memory 150 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The device memory 150 may store instructions executable by the device processor 155 and data such as messages or other messages received at the mobile device 110 from the occupant messaging system 105. The instructions and data stored in the device memory 150 may be accessible to the device processor 155 and possibly other components of the mobile device 110.

The device processor 155 is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. The device processor 155 may be programmed to determine where the user of the mobile device 110 is located in the vehicle. The device processor 155 may determine where the user of the mobile device 110 is located based on the communications with the communication tag 115 of the occupant messaging system 105. The device processor 155 may be further programmed to receive messages transmitted by the occupant messaging system 105, filter the message according to where the user is located in the host vehicle 100, and command the device interface 145 to present the messages remaining after filtering the messages. The device processor 155 may be programmed to filter the messages and messages based on the location of the user. That is, each message may identify an intended recipient location. The device processor 155 may command the device interface 145 to only display the messages and messages where the intended recipient location includes the location of the user. That way, the mobile device 110 will only display the messages and messages intended for someone seated where the user is seated in the host vehicle 100. The device processor 155 may be further programmed to command the device interface 145 to update the contextual user interface presented on the device interface 145 to display context-specific messages, messages, and controls. For instance, the device processor 155 may be programmed to command the device interface 145 to display controls for the infotainment system, cabin control system, etc., appropriate for where the user of the mobile device 110 is seated in the host vehicle 100.

Referring now to FIGS. 3A and 3B, the communication tag 115 is embedded in a seatbelt buckle 160 of a seatbelt assembly 165. A metal shield 170 at least partially encapsulates the communication tag 115 when the buckle 160 is unfastened (e.g., the latch 175 is not in the buckle 160). The metal shield 170 prevents any mobile devices 110 from communicating with the communication tag 115. The act of fastening the seatbelt causes the metal shield 170 to move to an area that unblocks the communication tag 115. FIG. 3A shows the metal shield 170 blocking the communication tag 115. FIG. 3B shows the metal shield 170 moved away from the communication tag 115 by the part of the latch 175 that enters the buckle 160. Moving the metal shield 170 away from the communication tag 115 exposes the communication tag 115, and allows signals transmitted by the communication tag 115 to reach the mobile device 110 so long as the mobile device 110 is within communication range of the mobile device 110. As such, the communication chip 140 of the mobile device 110 can only receive signals transmitted by the communication tag 115 when the seatbelt is buckle 160d. Otherwise, the metal shield 170 blocks signals transmitted by the communication tag 115.

Figure 4:
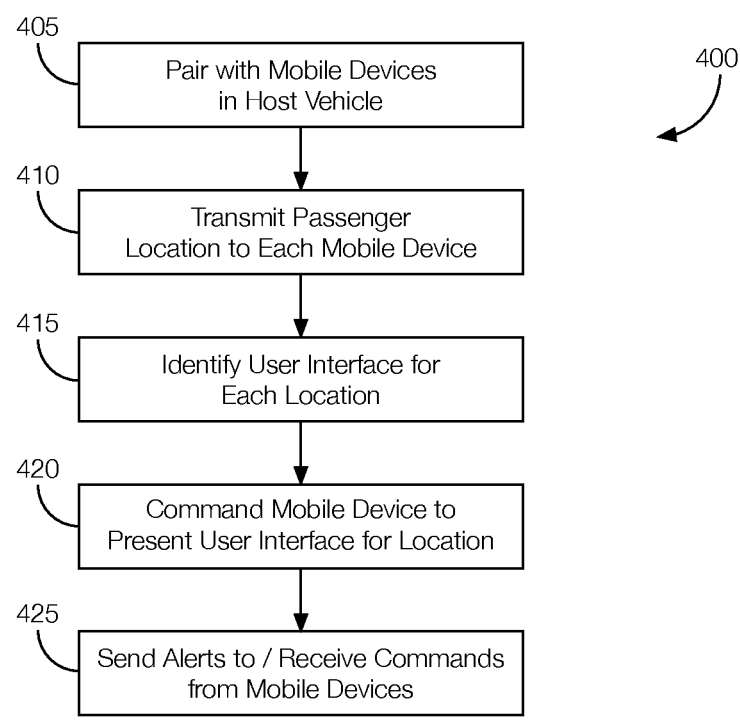
FIG. 4 is a flowchart of an example process that may be executed by the occupant messaging system.

FIG. 4 is a flowchart of an example process 400 that may be executed by the occupant messaging system 105. The process 400 may begin at any time while the host vehicle 100 is operating. The process 400 may continue to execute while the host vehicle 100 is running.

At block 405, the occupant messaging system 105 pairs with the mobile devices 110 in the host vehicle 100. The communication transceiver 120 may facilitate the pairing with the mobile devices 110. Further, the system processor 130 may determine which mobile devices 110 are paired based on communications between the system processor 130 and the communication transceiver 120.

At block 410, the occupant messaging system 105 transmits the passenger location to each mobile device 110. That is, when the passenger fastens his or her seatbelt by, e.g., inserting the latch 175 into the buckle 160, the latch 175 may move the metal shield 170 away from the communication tag 115 in the buckle 160. The communication tag 115 may transmit the passenger location to the closest mobile device 110 when the metal shield 170 is no longer blocking the communication tag 115.

At block 415, the occupant messaging system 105 identifies the contextual user interface for each location with a passenger. That is, the system processor 130 may be programmed to select each contextual user interface based on the location associated with the contextual user interface. The system processor 130 may be programmed to select the contextual user interface by querying a lookup table or other database, stored in the system memory 125, that relates the location to the contextual user interface.

At block, 420, the occupant messaging system 105 commands the mobile device 110 to present the contextual user interface associated with the location of the mobile device 110. That is, the system processor 130 may communicate to the mobile device 110 which messages are appropriate for the passenger using the mobile device 110 based on where the passenger is sitting in the host vehicle 100. In some instances, the mobile device 110 may be programmed to select the contextual user interface based on the location received at block 410. Thus, blocks 415 and 420 could be omitted if the mobile device 110 can determine which contextual user interface to present without additional information from the system processor 130.

At block 425, the occupant messaging system 105 sends messages to, and receives commands from, the mobile devices 110. The system processor 130 commands the communication transceiver 120 to transmit messages to the mobile devices 110. In turn, each mobile device 110 determines which messages to present to the user of the respective mobile device 110 based on where the user is seated in the host vehicle 100. The system processor 130 also receives and processes commands sent from the mobile devices 110. As discussed above, the mobile devices 110 only present commands appropriate for where the user of the mobile device 110 is located. Upon receipt of a command, the system processor 130 is programmed to process the command or forward the command to the appropriate vehicle sub system.

The process 400, specifically block 425, may continue to execute until the host vehicle 100 is shut down.

Figure 5:
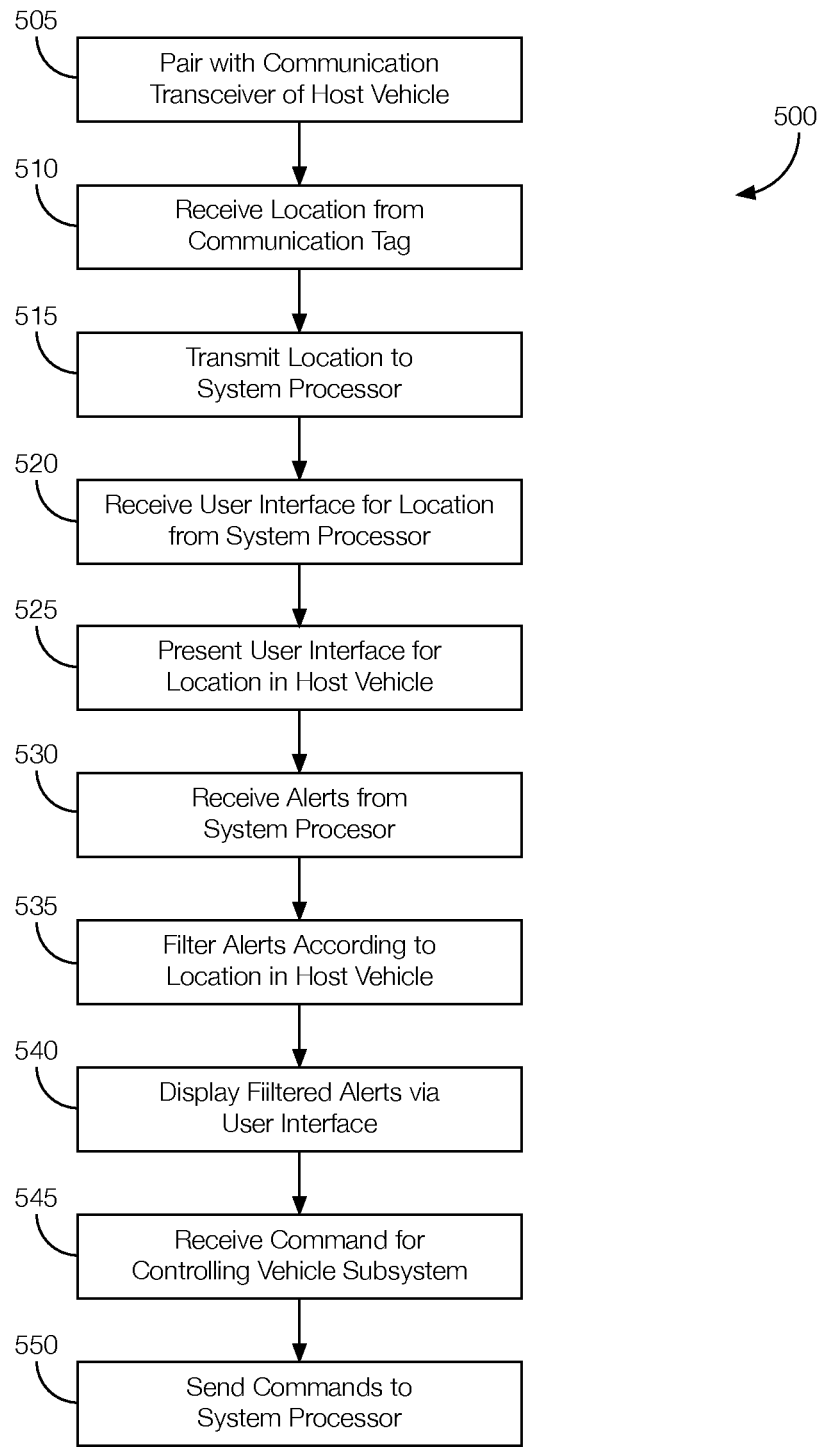
FIG. 5 is a flowchart of an example process that may be executed by the mobile device.

FIG. 5 is a flowchart of an example process 500 that may be executed by the mobile device 110. The process 500 may begin at any time the mobile device 110 is located in the host vehicle 100 and the host vehicle 100 is operating such that the occupant messaging system 105 can communicate with the mobile device 110.

At block 505, the mobile device 110 pairs with the occupant messaging system 105. For instance, the device processor 155 may command the communication chip 140 to pair with the communication transceiver 120 of the occupant messaging system 105. Pairing with the occupant messaging system 105 may include the mobile device 110 identifying itself to the occupant messaging system 105. That way, the occupant messaging system 105 may distinguish between mobile devices 110 located in the host vehicle 100.

At block 510, the mobile device 110 receives the location of the passenger carrying the mobile device 110 from the communication tag 115. The communication tag 115 may send the location of the passenger to the communication chip 140 in the mobile device 110 via, e.g., the near-field communication protocol. As discussed above, the communication tag 115 may be blocked by the metal shield 170 until the person carrying the mobile device 110 fastens his or her seatbelt. Fastening the seatbelt may cause the latch 175 to move the metal shield 170 away from the communication tag 115 located in the buckle 160. The communication tag 115 may transmit the passenger location to the communication chip 140 of the mobile device 110 when the metal shield 170 is no longer blocking the communication tag 115.

At block 515, the mobile device 110 transmits the location, in the host vehicle 100, of the passenger using the mobile device 110 to the occupant messaging system 105. That is, the device processor 155 may command the communication chip 140 to transmit the location determined from the communication tag 115 to the communication transceiver 120 of the host vehicle 100. That way, the occupant messaging system 105 can learn which seats are occupied with users of mobile devices 110 and which mobile device 110 in the host vehicle 100 is associated with which seat.

At block 520, the mobile device 110 receives the contextual user interface from the occupant messaging system 105. As discussed above, the system processor 130 may communicate to the mobile device 110 which messages are appropriate for the passenger using the mobile device 110 based on where the passenger is sitting in the host vehicle 100. Thus, block 520 may include the communication chip 140 receiving the contextual user interface appropriate for where the passenger carrying the mobile device 110 is sitting in the host vehicle 100. Receiving the contextual user interface may include receiving a list of message types (e.g., ADAS messages, climate controls, infotainment system controls, etc.) that are appropriate for the passenger carrying the mobile device 110 given that passenger's location in the host vehicle 100. In some instances, the mobile device 110 may be programmed to select the contextual user interface based on the location received at block 510. Thus, the device processor 155 may, at block 520, determine which contextual user interface to present without additional information from the system processor 130.

At block 525, the mobile device 110 presents the contextual user interface. The device processor 155 may present the contextual user interface via the device interface 145, which as discussed above could be a touchscreen display, incorporated into the mobile device 110. Presenting the contextual user interface may include presenting messages for the passenger using the mobile device 110 and present prompts for the passenger to provide user inputs controlling various vehicle subsystems such as the infotainment system, climate control system, door locks, windows, etc.

At block 530, the mobile device 110 receives messages and messages from the occupant messaging system 105. For instance, the messages and messages may be transmitted from the occupant messaging system 105 as a result of the system processor 130 commanding the communication transceiver 120 to transmit the message to all mobile devices 110 located in the host vehicle 100. The device processor 155 of each mobile device 110 in the host vehicle 100 may receive the messages and messages transmitted by the communication transceiver 120 via, e.g., the communication chip 140 of the respective mobile device 110.

At block 535, the mobile device 110 filters the messages or messages. That is, the device processor 155 determines whether the message is intended for the passenger using the mobile device 110 based on the location determined at block 510. Each message may identify the intended recipient by location in the host vehicle 100. The device processor 155 may filter messages or messages by excluding those intended for mobile devices 110 used by passengers at other locations than the passenger using the mobile device 110. Excluding the message may include deleting the message from the mobile device 110 or simply refraining from displaying the message on the device interface 145 of the mobile device 110.

At block 540, the mobile device 110 displays the message via the contextual user interface. That is, the device processor 155 may command the device interface 145 to present the messages remaining after the filter is applied at block 535. Presenting the messages may include presenting the ADAS alerts, cabin control messages, infotainment system messages, or other messages appropriate for the passenger using the mobile device 110 given the passenger's location in the host vehicle 100.

At block 545, the mobile device 110 receives commands for controlling various vehicle subsystems such as the infotainment system, climate control system, door locks, windows, etc. Prompts to provide such commands may be incorporated into the user interface presented at block 525. In some instances, the commands made available to the passenger may also be based on the filter applied at block 535. Thus, the commands may be presented via the contextual user interface according to where the passenger is seated in the host vehicle 100.

At block 550, the mobile device 110 sends commands received at block 540 to the occupant messaging system 105. For instance, the contextual user interface may present various messages and prompts for commands to the user of the mobile device 110. The device interface 145 may receive commands via, e.g., the touchscreen, keyboard, mouse, etc. The commands may be controls for various vehicle systems such as the climate control system, infotainment system, door locks, windows, etc. The device processor 155 may command the communication chip 140 to transmit received commands to the occupant messaging system 105. The communication transceiver 120 may receive the commands, and the system processor 130 may process the commands. Processing the commands may include the system processor 130 forwarding the commands to the appropriate vehicle sub system.

The process 500 may continue to execute blocks 530-550 for as long as the host vehicle 100 and mobile device 110 are operating and the mobile device 110 remains paired with the occupant messaging system 105.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle occupant messaging system comprising:
a communication tag located in a buckle of a vehicle seatbelt assembly and configured to wirelessly transmit signals, to a mobile device in a host vehicle, representing a seating location of a passenger in the host vehicle using the mobile device;
a communication transceiver programmed to transmit messages to the mobile device; and
a system processor programmed to generate the messages to the mobile device, the messages identifying the location of the passenger in the host vehicle;
wherein the buckle is configured to block the signals transmitted by the communication tag when the seatbelt assembly is unfastened.

2. The vehicle occupant messaging system of claim 1, wherein the buckle includes a metal shield that at least partially encapsulates the communication tag when the seatbelt assembly is unfastened.

3. The vehicle occupant messaging system of claim 2, wherein the vehicle seatbelt assembly includes a latch that moves the metal shield away from the communication tag when the seatbelt assembly is fastened.

4. The vehicle occupant messaging system of claim 1, wherein the system processor is programmed to receive the location of the passenger from the mobile device.

5. The vehicle occupant messaging system of claim 1, wherein the system processor is programmed to select a contextual user interface based on the location of the passenger.

6. The vehicle occupant messaging system of claim 5, wherein the system processor is programmed to command the mobile device to present the contextual user interface.

7. The vehicle occupant messaging system of claim 1, wherein the communication transceiver is programmed to receive commands from the mobile device and wherein the system processor is programmed to process the commands received from the mobile device.

8. The vehicle occupant messaging system of claim 1, wherein the messages generated by the system processor includes at least one of driver-assistance system alerts, messages associated with a vehicle infotainment system, and messages associated with a climate control system.

9. The vehicle occupant messaging system of claim 1, wherein the mobile device is programmed to filter messages according to the location represented by the signal transmitted from the communication tag and only display filtered messages.

* * * * *